May 20, 1930.　　　J. MAINELLO ET AL　　　1,759,125
WIRE GUARD
Filed June 14, 1927
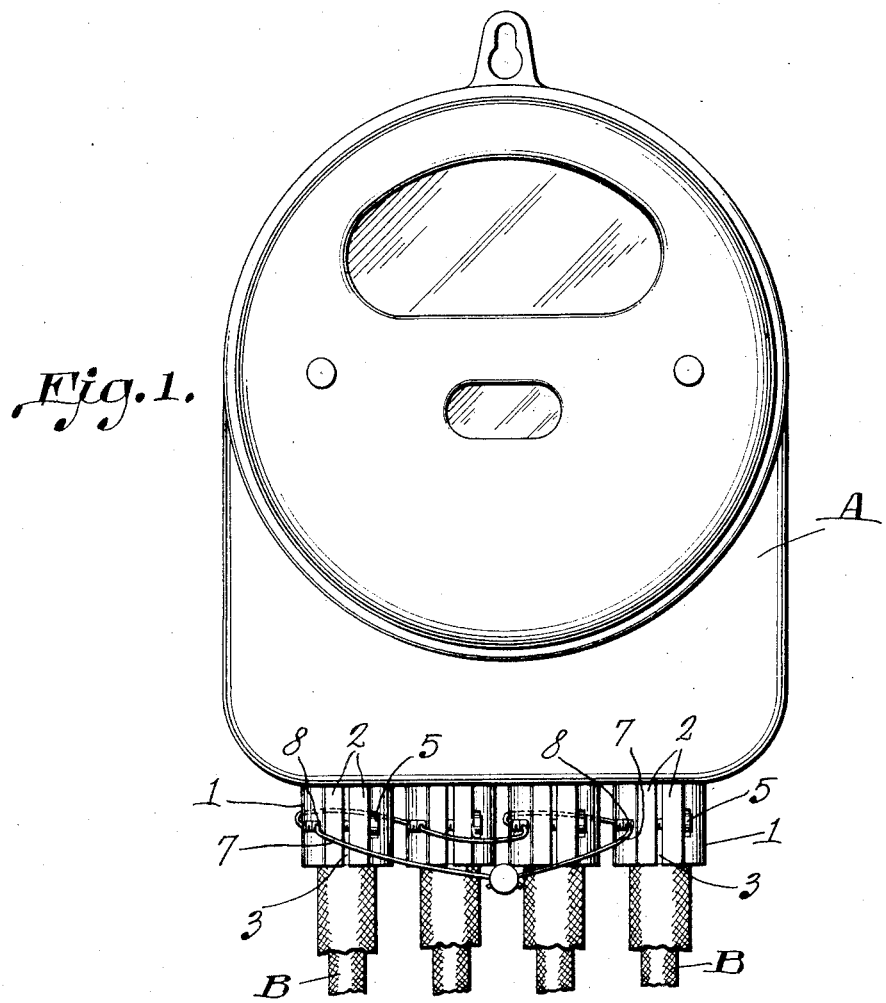
Fig. 1.
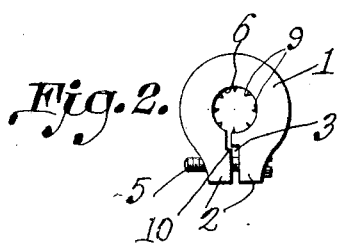
Fig. 2.
Fig. 3.　　　Fig. 4.
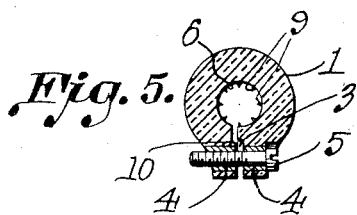
Fig. 5.
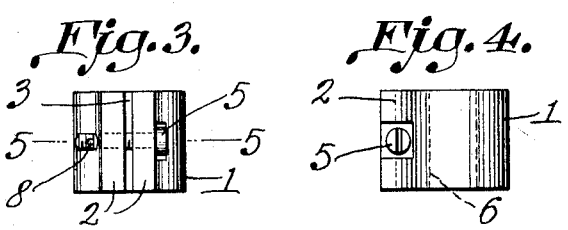
J. Mainello and
J. P. Bacca　Inventors
By C. A. Snow & Co.
Attorneys Patented May 20, 1930

1,759,125

UNITED STATES PATENT OFFICE

JULIE MAINELLO AND JOSEPH P. BACCA, OF TRINIDAD, COLORADO

WIRE GUARD

Application filed June 14, 1927. Serial No. 198,858.

This invention relates to a guard or protecting device for use in connection with electric wires for the purpose of preventing the theft of current.

Where service wires are extended into electric meters it frequently happens that the openings in the meter boxes through which the wires are extended are left exposed sufficiently to permit the insertion of one or more wires whereby current can be withdrawn without actuation of the meter mechanisms.

It is an object of the present invention to provide a simple form of clamp or protecting device which can be applied readily to a wire and held thereby snugly against the wall of the meter box so as to completely close the opening in the box through which the wire is extended and thus prevent theft of current in the manner pointed out.

Another object is to provide a device of this character which is simple and inexpensive and can be applied readily to the wires extending into a meter.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings the preferred form of the invention has been shown.

In said drawings,

Figure 1 is a front elevation of a meter showing several of the guards applied to the wires extending into the meter.

Figure 2 is a top plan view of one of the devices.

Figure 3 is a front elevation thereof.

Figure 4 is a side elevation.

Figure 5 is a section on line 5—5, Figure 3, the clamping screw being shown in plan.

Referring to the figures by characters of reference A designates an electric meter of the ordinary type and B designates wires extending into the meter through openings in one wall thereof. For the purpose of completely closing these openings so as to prevent the insertions of wires whereby current might be stolen, the guard constituting the present invention has been devised. This guard consists of a split ring or band 1 having a relatively thick wall and formed of hard rubber or any other suitable material preferably insulation. Ears 2 are extended from the ring at opposite sides of the radial slit 3 provided therein and, in the structure illustrated each of these ears is provided with a transverse bushing 4 of brass or the like. These bushings are adapted to be engaged by a screw 5 insertible thereinto. The opening 6 extending through the ring or band is of a diameter substantially equal to the external diameter of the wire to which the device is to be applied. Thus after the ring or band has been placed on a wire B and positioned tight against the apertured wall of the meter casing, the screw 5 extending through the ears of said band can be tightened so as to bind the device tightly on the wire. Thereafter a sealing wire 7 can be inserted through an aperture 8 in the projecting threaded portion of the screw so as to prevent loosening of the band without breaking the seal. This aperture is preferably located at such a point that when the wire is seated therein the screw is practically held fixed so that it cannot be rotated in either direction.

Obviously by placing one of these devices on each wire and positioning the same where it fits snugly against the apertured wall of the meter casing, it becomes impossible to insert a wire and steal current without first breaking the seal and thereafter loosening and shifting the guard.

For the purpose of preventing the ring or band from being slipped out of position after it has been clamped upon the wire, teeth or projections 9 can be extended inwardly from the band or, if preferred, corrugations can be used, these corrugations extending around the opening 6. Thus when the band or sleeve or ring is tightened these projecting parts will bite into the insulation of the wire and even though the parts should loosen slightly, it would not be possible to slip the band or ring out of position. To further safeguard the wire the inner or adjoining faces of the ears 2 are offset as shown at 10 so as to interfit and thus prevent the insertion of a wire between said faces when they are not brought tight together.

These devices can of course be made in different sizes so as to fit wires of different diameters.

What is claimed is:

1. The combination with an electric meter box and an insulated wire extending thereto, of a bushing embracing the wire and having normally spaced portions providing a substantially radial slot, said bushing being of a thickness sufficient to close the space between the wire and the wall of the opening in which it is seated, all parts of the bushing being located outside of the meter box, and adjustable means engaging the spaced portions of the bushing for contracting the slot and clamping said bushing upon the insulated wire to hold it against displacement relative to the wire and meter box.

2. The combination with an electric meter box and an insulated wire extending thereinto, of a bushing embracing the wire and having normally spaced portions providing a substantially radial slot, said bushing being of a thickness sufficient to close the space between the wire and the wall of the opening in which it is seated, all parts of the bushing being located outside of the meter box, projections extending inwardly from the bushing, and shiftable with the bushing along the insulated wire during the adjustment of the bushing to the wire and meter box, and adjustable means engaging the spaced portions of the bushing for contracting the slot and forcing said projections into the insulation of the wire and clamping the bushing about the wire thereby to hold said bushing against displacement relative to the wire and meter box.

3. The combination with an electric meter box and an insulated wire extending thereinto, of a bushing embracing the wire and having normally spaced portions providing a substantially radial slot, said bushing being of a thickness sufficient to close the space between the wire and the wall of the opening in which it is seated, all parts of the bushing being located outside of the meter box, projections extending inwardly from the bushing, and shiftable with the bushing along the insulated wire during the adjustment of the bushing to the wire and meter box, adjustable means engaging the spaced portions of the bushing for contracting the slot and forcing said projections into the insulation of the wire and clamping the bushing about the wire thereby to hold said bushing against displacement relative to the wire and meter box, and cooperating means on the spaced portions of the bushing for preventing insertion of an object through the slot between said portions into the space between the bushing and the meter box and between the wire and the meter box.

4. The combination with an electric meter box and an insulated wire extending thereinto, of a bushing embracing the wire and having normally spaced portions forming a slot therebetween, said bushing being of a thickness sufficient to close the space between the wire and the wall of the opening in which it is seated, all parts of the bushing being located outside of the meter box, projections extending inwardly from the bushing, and shiftable with the bushing along the insulated wire during the adjustment of the bushing to the wire and meter box, adjustable means engaging the spaced portions of the bushing for contracting the slot and forcing said projections into the insulation of the wire and clamping the bushing about the wire thereby to hold said bushing against displacement relative to the wire and meter box, and sealing means for preventing loosening of the bushing relative to the wire and meter box without detection.

In testimony that we claim the foregoing as our own, we have hereto affixed our signatures.

JULIE MAINELLO.
JOSEPH P. BACCA.